United States Patent
Jacobsson et al.

(10) Patent No.: US 7,661,705 B2
(45) Date of Patent: Feb. 16, 2010

(54) AIRBAG UNIT

(75) Inventors: Borje Jacobsson, Bramhult (SE); Mats Berntsson, Melbourne (AU); Fredrik Kjell, Alingsas (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 12/032,909

(22) Filed: Feb. 18, 2008

(65) Prior Publication Data

US 2008/0136149 A1 Jun. 12, 2008

Related U.S. Application Data

(63) Continuation of application No. PCT/EP2006/007222, filed on Jul. 21, 2006.

(30) Foreign Application Priority Data

Aug. 18, 2005 (DE) .................. 10 2005 039 451

(51) Int. Cl.
 B60R 21/213 (2006.01)
 B60R 21/237 (2006.01)
(52) U.S. Cl. ............... 280/730.2; 280/728.2; 280/743.1
(58) Field of Classification Search ............. 280/728.2, 280/730.2, 743.1, 743.2; 493/243, 918
 See application file for complete search history.

(56) References Cited

U.S. PATENT DOCUMENTS

| | | | | |
|---|---|---|---|---|
| 5,613,698 A * | 3/1997 | Patercsak et al. | ......... | 280/728.1 |
| 5,628,527 A * | 5/1997 | Olson et al. | ............. | 280/730.2 |
| 5,765,867 A * | 6/1998 | French | ................... | 280/743.2 |
| 6,145,879 A * | 11/2000 | Lowe et al. | ............... | 280/743.1 |
| 6,447,005 B2 * | 9/2002 | Alb et al. | .................. | 280/730.2 |
| 6,626,456 B2 * | 9/2003 | Terbu et al. | .............. | 280/728.2 |
| 6,644,686 B2 * | 11/2003 | Saelzle | ..................... | 280/728.3 |
| 6,808,199 B2 * | 10/2004 | Saderholm et al. | ........ | 280/730.2 |
| 6,874,810 B2 * | 4/2005 | Soderquist | ............... | 280/728.3 |
| 6,889,999 B2 * | 5/2005 | Dominissini et al. | ..... | 280/730.2 |
| 6,991,255 B2 * | 1/2006 | Henderson et al. | ........ | 280/730.2 |
| 7,083,188 B2 * | 8/2006 | Henderson et al. | ........ | 280/730.2 |
| 7,159,894 B2 * | 1/2007 | Ronne et al. | ............. | 280/728.2 |
| 7,163,231 B2 * | 1/2007 | Kumagai | ................. | 280/730.2 |
| 7,303,206 B2 * | 12/2007 | Kippschull et al. | ........ | 280/728.2 |
| 7,357,408 B2 * | 4/2008 | Hall et al. | ................. | 280/728.2 |
| 7,401,805 B2 * | 7/2008 | Coon et al. | .............. | 280/730.2 |
| 2002/0163169 A1 * | 11/2002 | Fischer | ..................... | 280/730.2 |
| 2003/0090092 A1 * | 5/2003 | Salzle | ...................... | 280/730.2 |
| 2005/0082798 A1 | 4/2005 | Tallerico et al. | | |
| 2005/0104335 A1 | 5/2005 | Henderson et al. | | |

FOREIGN PATENT DOCUMENTS

| | | | |
|---|---|---|---|
| GB | 2 309 942 A | | 8/1997 |
| GB | 2 394 921 A | | 5/2004 |
| SE | WO 2005/049390 A | | 6/2005 |

* cited by examiner

*Primary Examiner*—Paul N Dickson
*Assistant Examiner*—Laura Freedman
(74) *Attorney, Agent, or Firm*—Brinks Hofer Gilson & Lione

(57) ABSTRACT

In at least one embodiment of the present invention, an airbag unit is provided. The airbag unit comprises an airbag made of fabric. The unit has fastening devices for attaching the airbag to a motor vehicle. A cover section is proximate to the fastening devices and is fastened to the airbag. The cover section is configured to not completely cover the airbag when the airbag is in an unrolled state and forms a wrapping of the airbag when the airbag is rolled-up with the cover section to define rolled-up state.

12 Claims, 2 Drawing Sheets

AIRBAG UNIT

CROSS REFERENCE TO RELATED APPLICATIONS

This application claims priority to PCT patent application WO 2007/019940 filed Jul. 21, 2006 and DE patent application 102005039451.5 filed Aug. 18, 2005.

FIELD OF THE INVENTION

The present invention relates to an airbag unit with an airbag for protection of an occupant of a motor vehicle.

BACKGROUND OF THE INVENTION

Airbag units may be configured as side airbags or so-called curtain airbags that are arranged in interior door panels.

In order to protect these airbags, which may be elongated, during transport and installation, they are inserted into a pre-fabricated bag. This may entail an increased installation expense because of the manual work that is required.

From GB 2,309,942 A1, an airbag is known, in which there are fabric portions on the far side of a chamber of the gas bag formed by a peripheral seam that are turned back and sewn to one another in order to accommodate the part of the folded airbag that forms the chamber. The disadvantage of this airbag is that there is a large amount of work involved in turning back and sewing the protruding fabric portions. An embodiment of this type is likewise very expensive, since expensive special airbag fabric is used for the wrapping.

SUMMARY OF THE INVENTION

In at least one embodiment of the present invention, an airbag unit that can be manufactured inexpensively and quickly, without exhibiting functional disadvantages is provided.

The airbag unit is provided with a fabric airbag connected to a gas generator for inflating and unfolding the airbag from a rolled-up or folded-up state into an unrolled or unfolded activated state. Fastening devices for attaching the airbag to a motor vehicle are provided. A cover section is arranged in the area of the fastening devices and is preferably fastened to the fastening devices. The cover section may not completely cover the airbag in the unrolled or unfolded state and may be rolled up or folded together with the airbag. Thus, in the airbag's rolled-up or folded-up state, the cover area forms a wrapping that protects the expensive fabric of the airbag so as to minimize damage to the airbag during transport or installation. Accordingly, the airbag is rolled up or folded from a side of the non-inflated airbag facing away from, preferably opposite, the fastening devices with the cover section being arranged at the outer side of the rolled up airbag. By rolling up the cover and airbag together, complex sewing of the protruding fabric sections may be eliminated, which preferably saves cost and time, and a protective wrapping is also formed by the cover section.

In one aspect, the present invention provides that the cover section is sewn on or adhered to the airbag. The cover section may also be fastened to the fastening devices, which may be configured as lugs, for example.

The airbag may include fabric compartments that are connected to one another via a peripheral seam. Alternatively, it is provided that the airbag is a one-piece woven bag and the cover section advantageously likewise consisting of a fabric, which preferably is different from the fabric of the airbag. As the cover section and/or fabric section has merely a protective function during transport and installation, protecting, if necessary, the airbag from sharp-edged trim panels during unfolding in the area of the fastening devices, it may not be necessary that the fabric be the high quality fabric of the airbag. A fabric or material of lower quality may be adequate to ensure the protective function, which reduces the manufacturing costs of the airbag.

In order to ensure the most complete wrapping possible in the rolled-up or folded-up state of the airbag, the cover section and/or fabric section may extend over the whole length of the rolled-up or folded airbag, preferably providing a width of the cover section that at least corresponds to the perimeter of the rolled up airbag. Thus, it may be ensured, on the one hand, that the cover section covers the whole length of the rolled-up airbag, and, on the other hand, that the airbag is enclosed by the cover section.

In order to minimize the use of material for the cover section and to ensure a stable wrapping, the width of the cover section may correspond to at most twice the perimeter of the rolled-up airbag. Thus, the cover section may be secured and held in the rolled up state without unwind spontaneously.

In one example to ensure additional protection and fixation, locking devices are arranged on the cover section by means of which the airbag is held in the rolled-up position. These locking devices may be configured as straps, Velcro fasteners, button attachments, elastic straps, or clamps, for example. It is likewise possible that separate fastening devices, like elastic straps, may be used in order to hold the rolled-up and wrapped airbag in position.

In another example to minimize the installation effort, the cover section is only fastened to the airbag along one side or edge, preferably on one side of the longitudinal edge, on a peripheral seam in the area of the fastening devices, for example. Thus, the cover section may be sewn on at the same time as airbag closure in one operation.

BRIEF DESCRIPTION OF THE DRAWINGS

An exemplary embodiment of the present invention is explained in more detail hereinafter by the included drawings. The drawings are as follows:

FIG. 1a is a side view of an airbag with a cover section in accordance with at least one embodiment of the present invention;

FIG. 1b is a cross-sectional illustration along line BB of FIG. 1a; and

DETAILED DESCRIPTION

Figure 1:
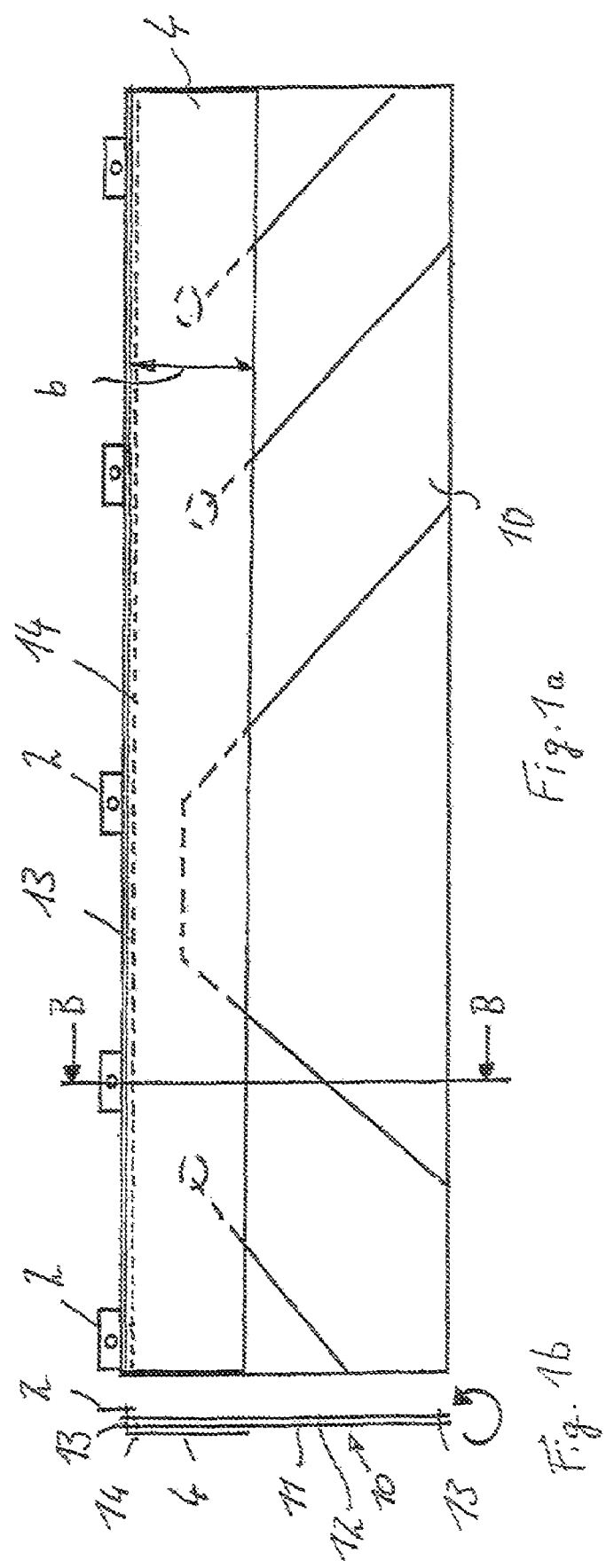

FIG. 1a shows an airbag 10 in the unfolded or unrolled deactivated state. In the present case, the airbag 10 has a rectangular shape. There are fastening devices 2 in the form of lugs arranged on the upper edge of the airbag 10. The airbag 10 is closed by means of a peripheral seam 13 and forms a chamber, which may be filled with gas by means of a gas generator (not shown) provided with deflection or distribution devices, if necessary. Along the whole length of the airbag 10 a cover section 4 in the form of a fabric is arranged on the upper edge of the airbag 10 and fastened by means of a fastening seam 14. The cover section 4 may be made of a fabric or other protective material, such as for example, film. The width b of the cover section 4 may be substantially smaller than the width of the airbag 10. In the present case, the width b is only about ⅓ of the width of the airbag 10.

FIG. 1b is a cross-sectional view along line B-B of FIG. 1a illustrating that the airbag 10 includes two fabric sections 11, 12, which are sewn to one another at the upper edge and lower edge by means of the peripheral seam 13. The cover section 4, which may be in the form of a fabric strip, is fastened by means of the fastening seam 14 to the upper side of the airbag 10, which may be for example, the side that is on the outside in the rolled-up state. The fastening devices 2, which in the present case are sewn to the airbag 10 together with the peripheral seam 13, are likewise fastened separately. In order to manufacture the airbag 10 so as to be ready to install, it is rolled up from the end opposite the fastening devices 2, as indicated by the arrow. By rolling up counterclockwise, an elongated roll shape is obtained, as shown in the cross-section illustrated in FIG. 2. In the rolled-up state, the cover section 4 completely encloses the airbag unit 1 at least once. In this case, the width b of the cover section 4 has been selected such that approximately half the perimeter is covered so that the cover section 4 is rolled up and secured as well. Thus, spontaneous unrolling or unfolding of the cover section 4 may be prevented, and the cover section is preferably held in position independently. Additionally, locking devices or elastic straps may be provided that are slung or wrapped around the rolled-up airbag in order to secure the airbag in the rolled-up state.

Figure 2:
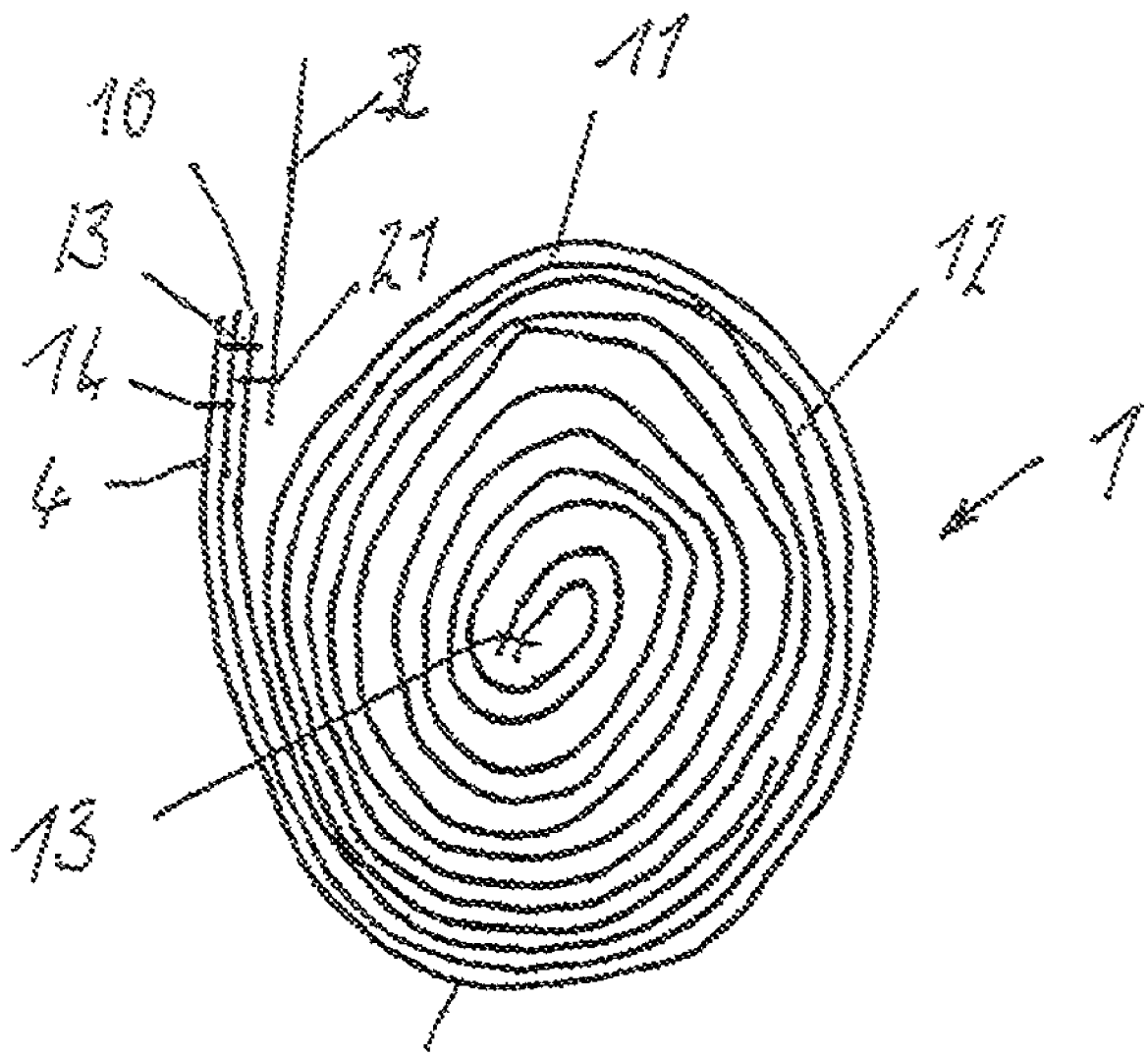
FIG. 2 is an airbag in rolled-up state in accordance with at least one embodiment of the present invention.

In the embodiment according to FIG. 2, the fastening devices 2 may be fastened to the inner fabric section 12 by means of a separate fastening seam 21. Alternatively or additionally, the fastening devices 2 may also be fastened by means of the peripheral seam 13. The cover section 4 may be likewise fastened to the outer fabric section 11 by means of a separate fastening seam 14. Alternatively or additionally, fastening may also be by means of the peripheral seam 13 in the area of the fastening devices 2.

In at least one embodiment, instead of a complete cover in the unfolded state, which may have a correspondingly high material cost, only a partial wrapping in the unfolded or unrolled state of the airbag 10 is provided, which preferably completely covers the airbag 10 in the rolled-up or folded-up state. The cover section 4 and/or fabric section may be fastened only at one edge in the area of the fastening devices 2; alternatively, it may also be fastened at the narrow sides to the airbag 10. The protective function of the cover section 4 may also be implemented by a fabric or film which does not have the higher mechanical properties of the airbag fabric.

As a person skilled in the art will readily appreciate, the above description is meant as an illustration of the implementation of the principles of this invention. This description is not intended to limit the scope or application of this invention in that the invention is susceptible to modification, variation and change, without departing from the spirit of this invention, as defined in the following claims.

The invention claimed is:

1. An airbag unit comprising:
    an airbag made of a fabric and adapted to be connected to a gas generator for inflating and unfolding the airbag from one of a rolled-up or a folded-up state into one of an unrolled or an unfolded activated state, the airbag having fastening devices for attaching the airbag to a motor vehicle; and
    a cover section proximate to the fastening devices and fastened to the airbag, the cover section configured to not completely cover the airbag when the airbag is in the one of the unrolled or the unfolded activated state and configured to form a wrapping that covers the airbag when the cover section is rolled-up or folded-up together with the airbag in the one of the rolled-up or the folded-up state with a portion of the cover section positioned between at least two rolled-up or folded-up sections of the airbag so as to be intertwined with the airbag, and wherein the cover section is only fastened to the airbag along one side of the airbag.

2. An airbag unit according to claim 1, wherein the cover section is one of sewn and adhered to the airbag.

3. An airbag unit according to claim 1, wherein the airbag includes fabric sections which are connected to one another via a peripheral seam.

4. An airbag unit according to claim 1, wherein the cover section is made of fabric.

5. An airbag unit according to claim 4, wherein the fabric of the cover section is different from the fabric of the airbag.

6. An airbag unit according to claim 1, wherein the cover section extends along approximately a whole length of the airbag in the one of the rolled-up or the folded-up state.

7. An airbag unit according to claim 1, wherein the cover section has a width which corresponds to at least a perimeter of the airbag in the one of the rolled-up or the folded-up state.

8. An airbag unit according to claim 7, wherein the width of the cover section at most corresponds to twice the perimeter of the airbag in the one of the rolled-up or the folded-up state.

9. An airbag unit according to claim 1, further comprising locking devices arranged on the cover section that hold the airbag in the one of the rolled-up or the folded-up state.

10. An airbag unit according to claim 9, wherein the locking devices are configured as one of straps, hook and loop fasteners, button attachments, elastic straps and clamps.

11. An airbag unit according to claim 1, wherein the cover section is fastened to the airbag along the one side adjacent to the fastening devices.

12. An airbag unit according to claim 1, wherein the cover section forms the wrapping of the airbag when starting from a side of the airbag opposite the fastening devices, the airbag is one of rolled-up or folded-up with the cover section to form the one of the rolled-up or the folded-up state of the airbag.

* * * * *